United States Patent [19]

Hamilton et al.

[11] 4,117,970
[45] Oct. 3, 1978

[54] METHOD FOR FABRICATION OF HONEYCOMB STRUCTURES

[75] Inventors: C. Howard Hamilton, Thousand Oaks; Leonard A. Ascani, Jr., Palos Verdes Estates, both of Calif.

[73] Assignee: Rockwell International Corporation, El Segundo, Calif.

[21] Appl. No.: 742,298

[22] Filed: Nov. 16, 1976

[51] Int. Cl.² ............................................. B23K 31/00
[52] U.S. Cl. ................................... 228/173 A; 72/63; 219/85 E; 228/181; 228/190; 228/193
[58] Field of Search ........... 228/173 R, 173 A, 173 B, 228/173 C, 181, 190, 193–197, 234, 141.1; 72/63; 219/85 E

[56] References Cited
U.S. PATENT DOCUMENTS

| 2,882,588 | 4/1959 | Rieppel | 228/173 A X |
| 2,984,732 | 5/1961 | Herbert | 219/78 |
| 3,996,019 | 12/1976 | Cogan | 228/193 X |

*Primary Examiner*—Donald G. Kelly
*Attorney, Agent, or Firm*—Charles T. Silberberg

[57] ABSTRACT

A method for fabrication of honeycomb metallic structures combining superplastic forming and metallurgical bonding wherein a face sheet is formed and bonded to another face sheet and a core to form the desired structure. A metal honeycomb core is positioned between the first and second metal face sheets. The first face sheet, which has superplastic characteristics, is brought to within a temperature range suitable for superplastic forming. A pressure loading is applied to the first face sheet causing it to deform against the core and second metal face sheet. The face sheets and core are maintained under coordinated temperature-pressure-time duration conditions to produce metallurgical bonding to one another to form the desired honeycomb structure.

14 Claims, 3 Drawing Figures

METHOD FOR FABRICATION OF HONEYCOMB STRUCTURES

BACKGROUND OF THE INVENTION

For many years it has been known that certain metals, such as titanium and many of its alloys, exhibit superplasticity. Superplasticity is the capability of a material to develop unusually high tensile elongations with reduced tendency towards necking. This capability is exhibited by only a few metals and alloys and within limited temperature and strain rate range. An example of the superplastic forming process is disclosed in U.S. Pat. No. 3,340,101 to Fields, Jr., et al.

In our U.S. Pat. No. 3,920,175, there is disclosed a method for superplastic forming of metals with concurrent diffusion bonding. This patent is generally directed to superplastically deforming a metal blank against a metal workpiece which is bonded to the metal blank. However, this patent does not disclose fabrication of honeycomb structures where a face sheet having superplastic characteristics is deformed against a honeycomb core and another face sheet such that metallurgical bonding of the parts to one another results and without crushing or significant deformation of the core so that the desired honeycomb metallic structure is formed.

The prior art method of forming honeycomb structures normally involves separate forming of the face sheets, core, and edge members which has required costly preforming and very close tolerances, fitting up the parts, sealing of edge members, and brazing the face sheets to the core and edge member structure, with the accompanying contamination and flow problems of brazing. Thus, the prior art honeycomb structure is made up of numerous separate parts which must be individually formed and brazed together. Such parts have not proven overly reliable, have been costly to fabricate, and are not weight efficient.

The present invention is directed to a method for fabricating honeycomb metallic structures which combines superplastic forming and metallurgical bonding. More specifically, the present invention is directed to a method where a core is positioned between two metal blanks, with one of the metal blanks being superplastically formed against the core and other matel blank such that the parts are metallurgically bonded to one another to form a desired honeycomb structure.

SUMMARY OF THE INVENTION

It is, therefore, an object of the present invention to combine superplastic forming and metallurgical bonding in a method of making metallic honeycomb structures.

It is another object of the present invention to form a metallic honeycomb structure in one process from a core and two face sheets in the same apparatus thereby saving fabrication time, euqipment costs, avoiding fit-up problems, improving structure reliability, and lessening structure weight.

Briefly, in accordance with the invention, there is provided a method for fabricating metallic honeycomb structures from a first metal blank having superplastic characteristics, a second metal blank, and a honeycomb core. The core is positioned between the metal blanks. The first metal blank is brought to within a temperature range suitable for superplastic forming and a pressure loading is applied thereto to cause it to deform against the core and second metal blank. The metal blanks and core are maintained under coordinated temperature-pressure-time duration conditions sufficient to produce metallurgical bonding to one another.

Other objects and advantages of the invention will become apparent upon reading the following detailed description and upon reference to the drawings.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as defined by the appended claims.

DETAILED DESCRIPTION OF THE INVENTION

In order for superplastic forming to be successful, it is necessary to use a material that is suitable. The extent to which the material selected will exhibit superplastic properties is predictable in general terms from a determination of the strain rate sensitivity and a design determination of the permissible variation in wall thickness. Strain rate sensitivity can be defined as $m$ where $$m = \frac{d \ln \sigma}{d \ln \dot\epsilon}$$

where $\sigma$ is stress in pounds per square inch and $\dot\epsilon$ is strain rate in reciprocal minutes. Strain rate sensitivity may be determined by a simple and now well recognized torsion test described in the article, "Determination of Strain-Hardening Characteristics by Torsion Testing," by D. S. Fields, Jr. and W. A. Backofen, published in the proceedings of the ASTM, 1957, Vol. 57, pages 1259-1272. A strain rate sensitivity of about 0.5 or greater can be expected to produce satisfactory results with the larger the value (to a maximum of 1) the greater the superplastic properties. Maximum strain rate sensitivity in metals is seen to occur, if at all, as metals are deformed near the phase transformation temperature. Accordingly, the temperature immediately below the phase transformation temperature can be expected to produce the greatest strain rate sensitivity. For titanium alloys, the temperature range within which superplasticity can be observed is about 1450° F. to about 1850° F. depending upon the specific alloy used.

Other variables have been found to affect strain rate sensitivity and therefore should be considered in selecting a suitable metal material. Decreasing grain size results in correspondingly higher values for strain rate sensitivity. Additionally, strain rate and material texture affect the strain rate sensitivity. It has been found that for titanium, the m-value reaches a peak at an intermediate value of strain rate (approximately $10^{-4}$ in./in./sec.). For maximum stable deformation, superplastic forming should be done at or near this strain rate. Too great a variance from the optimum strain rate may result in loss of superplastic properties.

Figure 1:
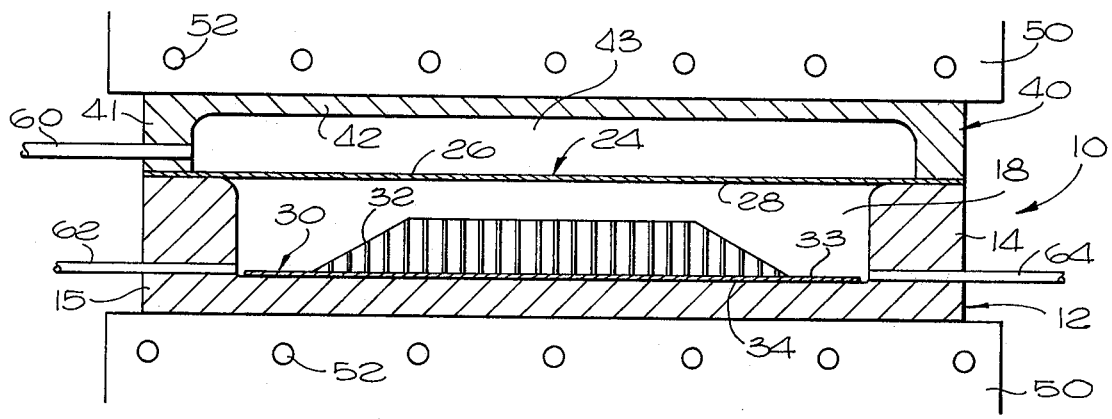
FIG. 1 is a cross-sectional elevational view of the apparatus employed in the present method showing the core positioned relative to the two face sheets prior to forming.

Turning first to FIG. 1, there it is shown an example of the apparatus generally indicated at 10 for carrying out the invention. Lower tooling 12 has side walls 14 in the form of a ring that can be of any desired shape and a preferably integral base plate 15. The inner surface of lower tooling 12 defines a chamber 18.

Metal blank 24, preferably in the form of a sheet having upper and lower opposed principle surfaces 26 and 28, respectively, is supported on tooling frame 12 and covers chamber 18. Any metal blank that exhibits suitable superplastic properties within practical temperature ranges can be used, but the present invention is particularly concerned with titanium and its alloys thereof, such as Ti-6A1-4V. Titanium and its alloys have been found to be particularly well suited for the present process in that these alloys exhibit very high superplastic properties in a temperature range suitable for diffusion bonding, i.e. 1450° F. to about 1850° F. depending upon the specific alloy used. The initial thickness of face sheet or diaphragm 24 is determined by the dimensions of the part to be formed.

Within chamber 18 is positioned a second metal face sheet 30 and a honeycomb core 32. While core 32 is shown spaced from blank 24, that is not required, i.e. core 32 could be positioned so that it contacts both blanks 30 and 24 such as by the use of shorter side walls 14. Optionally, blanks 24 could be preformed to approximately compliment the upper surface of core 32 in order to substantially equalize the time of pressure application by blank 24 over the upper surface of core 32. Metal face sheet 30 has principal surfaces 33 and 34. Metal face sheet 30 rests upon base plate 15 such that the principal surfaces of each of face plates 24 and 30 are opposed to one another. Preferably, face plates 24 and 30 are aligned parallel to one another. The material of core 32 is preferably non-superplastic, such as a beta-processed titanium alloy, or non-superplastic in the temperature range utilized for the forming of blank 24, in order to prevent its plastic deformation. Face sheet 30 is not required to be of a superplastic material unless plastic deformation of such face sheet is desired. However, the material for both core 32 and face sheet 30 should be such that metallurgical bonding of face sheets 24 and 30 and core 32 to one another can be effected under suitable temperature-pressure-time duration conditions.

Upper tooling frame 40 preferably has the same plan area shape as lower tooling frame 12 so that side walls 41, which are preferably integral with top plate 42, are in alignment with the side walls 14 of lower tooling 12. Upper tooling frame 40 defines a chamber 43 that is closed by metal blank 24.

The weight of upper tooling frame 40 acts as a clamping means for the metal blank 24. A single continuous edge of the blank 24 is effectively constrained between the upper support tooling frame 40 and the lower support tooling frame 12. This insures that the blank 24 will be stretched rather than drawn. Should it be desired, additional tightening means such as bolts (not shown) can be employed to more effectively constrain the blank 24. As shown in FIG. 1, an additional tightening means employed is a hydraulic press (not shown) having platens 50. The forming apparatus 10 is placed between platens 50 and compressed thereby assuring that blank 24 is effectively constrained and the chambers sealed from the air.

For superplastic forming, blank 24 must be brought to within a temperature range at which it exhibits superplastic characteristics, if it is not already in that range. Various heating methods can be used for heating blank 24 to the desired temperature range (where the metal would be in a plastic state having a suitable strain rate sensitivity). Thus, platens 50 can be made of ceramic material and provided with resistance heated wires 52. Heat from the resistance wires 52 is transmitted through tooling frames 12 and 40 to the enclosed chambers 18 and 43 and consequently to the metal blanks 24 and 30 and core 32. Other heating methods could alternately be used with the forming apparatus 10 ordinarily surrounded by the heating means if the heating platens are not used.

When blanks 24 and 30 and core 32 are reactive metals, such as titanium and its alloys, their surfaces are subject to contamination at the elevated temperatures required for superplastic forming and metallurgical bonding. Under such circumstances, the present method would be accomplished in an inert (or vacuum) atmosphere. A contamination prevention system which could be used to provide such an inert atmosphere is disclosed in U.S. Pat. No. 3,934,441 to Hamilton, et. al. As such, a gas line 60 is provided to chamber 43 and gas lines 62 and 64 are provided to chamber 18.

Forming of metal blank 24 is produced by a pressure differential between chambers 18 and 33, so that metal blank 24 acts as a diaphragm. The pressure loading can be accomplished in a variety of different ways. For example, a positive pressure can be maintained in chamber 43 while vacuum is applied to chamber 18, or positive pressure in chamber 43 can be increased to greater than the positive pressure in chamber 18.

Figure 2:
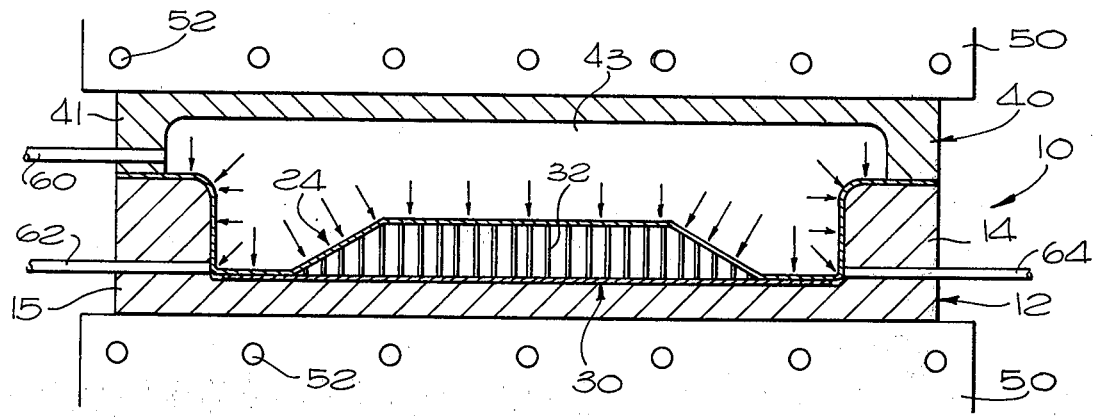
FIG. 2 is a cross-sectional elevational view of the apparatus shown in FIG. 1 showing the forming of a face sheet against the core and opposing face sheet.

FIG. 2 illustrates the superplastic forming of the metal blank 24 and the metallurgical bonding of blank 24 and 30 and core 32 to one another. During forming, the pressure above the diaphragm 24 in chamber 43 is greater than that below the diaphragm 24 in chamber 18. As the metal diaphragm 24 deforms due to the pressure differential, it contacts core 32 and blank 30 forcing inert gas remaining in chamber 18 through vents 62 and 64.

It has been found that differential pressures that can be used for superplastic forming normally vary between 15 psi to 300 psi. Forming times depend upon diaphragm thickness, material superplastic properties, and the pressure used and may vary from 10 minutes to 16 hours. In any case, the pressure selected should be such that the superplastic strain rate for blank 24 is not exceeded and core 32 is not significantly crushed or deformed.

Core 32 acts as a male die member during forming of metal blank 24. Because of the superplastic state of blank 24, it will conform to the shape dictated by the shape of core 32.

Optimally the temperature and pressures used for forming of blank 24 would also be suitable for bonding of the metal blanks 24 and 30 and core 32. Alternatively, the temperature and/or pressure could be varied after the forming of the blank 24 such that bonding could take place.

Bonding of metal blanks 24 and 30 and core 32 to one another is preferably accomplished by diffusion bonding. Diffusion bonding refers to the metallurgical joining of surfaces of similar or dissimilar metals by applying heat and pressure for a time duration so as to cause comingling of the atoms at the joint interface. Diffusion bonding is accomplished entirely in the solid state at or above one-half the base metal melting point (absolute). Actual times, temperatures, and pressures will vary from metal to metal. However, for Ti-6A1-4V, a temperature of about 1700° F. and a pressure of about 150–2000 psi over the bond interface area are normally used.

By virtue of the contact of blank 24 with core 32 and blank 30 resulting from the superplastic forming of blank 24, the pressure in chamber 43 which forces blank 24 against core 32 and blank 30, and the simultaneous application of heat (i.e. such that blanks 24 and 30 and core 32 are within a temperature range suitable for diffusion bonding), diffusion bonding between the parts along the interfaces results when such conditions are maintained for a suitable time duration. Bonding of the parts need not be concurrent, i.e. temperature and/or pressure might be required to be adjusted from that required for bonding of blanks 24 and 30 to bond core 32 to blank 30. It should be particularly noted that the bottom surface of core 32 is bonded to surface 33 of blank 30 by this method, i.e. by pressure applied by blank 24. Other forms of metallurgical bonding such as brazing could be used. If brazing was selected to be the joining method, a suitable brazing material would have to overlie the portions of the core 32 and blank 30 which are to be bonded to blank 24 and each other.

Optionally, the bottom face sheet 30 can also be superplastically formed to vary its shape when it has superplastic characteristics. This would depend on the die surface of lower plate 12 and result from the pressure applied by blank 24.

As the superplastic forming gas pressures typically used are less than those used normally in diffusion bonding, the joints produced by diffusion bonding during this process may not develop full parent metal strength, but rather be more analogous to a high quality brazed joint. However, the part can be subjected to a post bond anneal cycle to eliminate micropores and maximize joint strength. Full parent metal strength can be achieved, however, by increasing the forming gas pressure to such a level that complete diffusion bonding occurs. Increased bonding pressures can be imposed at or near completion of the forming cycle without impairing the superplastic forming. Where relatively high bonding pressures cannot be used where core 32 would be significantly crushed or deformed as a result, longer times of pressure application can alternatively be employed.

Figure 3:
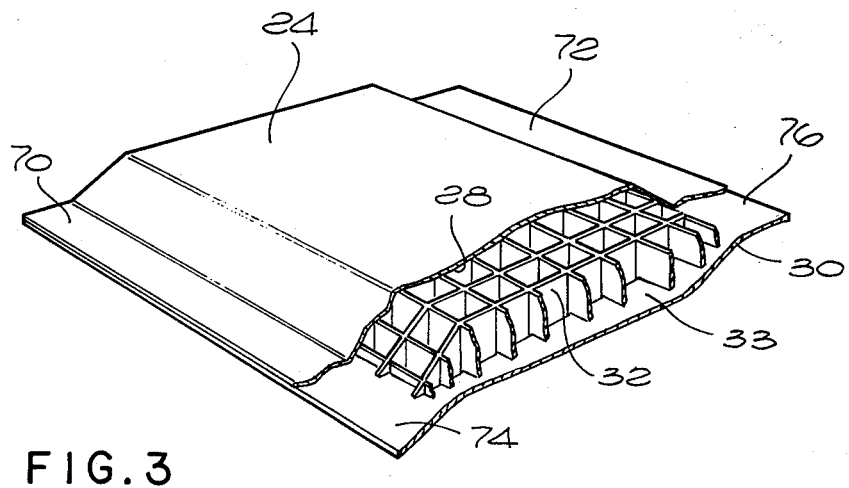
FIG. 3 is a perspective view with portions broken away of the finally formed honeycomb structure.

Referring now to FIG. 3, there is shown the final formed and bonded honeycomb structure. The part is completed by trimming off the outer edges of blank 24 which extend beyond blank 30. As can be seen, edges 70 and 72 of blank 24 are bonded to edges 74 and 76 respectively of face sheet 30. The upper surface of core 32 is bonded to the remainder of principal surface 28 of face sheet 24 while the lower surface of core 32 is bonded to the remainder of principal surface 33 of face sheet 30.

Thus, it is apparent that there has been provided, in accordance with the invention, a method for fabrication of honeycomb structures that fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

We claim:

1. A method for making a honeycomb metallic structure in a single operation comprising the steps of:
   positioning a metal honeycomb core, a first metal blank, and a second metal blank within a hollow forming apparatus for the duration of the method, the first metal blank having superplastic characteristics, the first metal blank and the second metal blank each having opposed principal surfaces;
   positioning the core between the first metal blank and the second metal blank;
   bringing the first metal blank to within a temperature range suitable for superplastic forming of the first metal blank;
   applying a pressure loading across the principal surfaces of the first metal blank causing the first metal blank to deform superplastically against, and into intimate contact with, the core and the second metal blank; and
   maintaining the first metal blank, the second metal blank, and the core under coordinated temperature-pressure-time duration conditions sufficient to produce metallurgical bonding of the first metal blank, the second metal blank, and the core to one another.

2. The method of claim 1 wherein said positioning of the core between the first metal blank and the second metal blank is such that the core is in contacting relationship with said second metal blank.

3. The method of claim 1 wherein the positioning of the core between the first metal blank and the second metal blank is such that the core is in contacting relationship with the first metal blank and the second metal blank.

4. The method of claim 1 wherein the metallurgical bonding is diffusion bonding.

5. The method of claim 1 wherein the temperature range suitable for superplastic forming is also suitable for metallurgical bonding.

6. The method of claim 1 wherein the pressure loading used for superplastic forming said first metal blank is of sufficient magnitude for the metallurgical bonding of said maintaining step.

7. The method of claim 5 wherein the pressure loading used for superplastic forming said first metal blank is of sufficient magnitude for the metallurgical bonding of said maintaining step.

8. The method of claim 4 wherein the hollow forming apparatus defines a cavity, and also including the step of positioning the first metal blank to divide the cavity into first and second chambers, and wherein the core and the second metal blank are located in the second chamber.

9. The method of claim 8 also including the step of providing an inert gas environment in the cavity, and wherein the pressure loading across the principal surfaces of the first metal blank comprises a greater pressure of inert gas in the first chamber relative to the second chamber and the second chamber is vented to allow for efflux of inert gas as the metal blank deforms and thereby reduces the size of the second chamber.

10. The method of claim 8 wherein the pressure loading across the principal surfaces of the first metal blank comprises maintaining a fluid pressure differential between the first chamber and the second chamber.

11. The method of claim 4 wherein the second metal blank has superplastic properties, and wherein the second metal blank is also brought to within a temperature range suitable for superplastic forming, and also including the step of:

applying pressure to the second metal blank by the first metal blank to cause at least a portion of the second metal blank to expand superplastically.

12. The method of claim 4 wherein the applying the pressure loading to the first metal blank is such that the first metal blank deforms against the core without significantly deforming the core.

13. The method of claim 4 wherein the first metal blank is a preform.

14. The method of claim 1 wherein the metallurgical bonding is brazing.

* * * * *